(12) United States Patent
Ye

(10) Patent No.: US 12,572,459 B2
(45) Date of Patent: Mar. 10, 2026

(54) MEMORY WITH IMPROVED INCOMPLETE ACTIVE PERFORMANCE LOSS TASK COMPLETION DETECTION

(71) Applicant: Micron Technology, Inc., Boise, ID (US)

(72) Inventor: Hui Ye, Shanghai (CN)

(73) Assignee: Micron Technology, Inc., Boise, ID (US)

( * ) Notice: Subject to any disclaimer, the term of this patent is extended or adjusted under 35 U.S.C. 154(b) by 0 days.

(21) Appl. No.: 18/583,795

(22) Filed: Feb. 21, 2024

(65) Prior Publication Data

US 2024/0320143 A1 Sep. 26, 2024

Related U.S. Application Data

(60) Provisional application No. 63/453,432, filed on Mar. 20, 2023.

(51) Int. Cl.
*G06F 12/02* (2006.01)
(52) U.S. Cl.
CPC .............................. *G06F 12/0246* (2013.01)
(58) Field of Classification Search
CPC .................................................. G06F 12/0246
See application file for complete search history.

(56) References Cited

U.S. PATENT DOCUMENTS

| | | | |
|---|---|---|---|
| 2013/0042054 A1* | 2/2013 | Jung ................... | G06F 12/0246 |
| | | | 711/E12.008 |
| 2015/0106556 A1* | 4/2015 | Yu ....................... | G06F 12/0246 |
| | | | 711/103 |
| 2016/0103481 A1* | 4/2016 | Griffith ................. | G06F 1/324 |
| | | | 713/323 |
| 2019/0391747 A1* | 12/2019 | Sheperek ............. | G06F 3/0679 |
| 2020/0211603 A1* | 7/2020 | Luo ...................... | G06F 11/076 |
| 2021/0365184 A1* | 11/2021 | Miller .................. | G06F 3/0659 |
| 2022/0066651 A1* | 3/2022 | Miller ................. | G11C 16/105 |
| 2023/0115457 A1* | 4/2023 | Koo ..................... | G11C 29/702 |
| | | | 711/154 |
| 2024/0302971 A1* | 9/2024 | Jang ..................... | G06F 3/0616 |

* cited by examiner

*Primary Examiner* — Tasnima Matin
(74) *Attorney, Agent, or Firm* — Dorsey & Whitney LLP

(57) ABSTRACT

Memory systems and devices (and associated methods) with improved active performance loss (APL) completion detection are described herein. In one embodiment, a memory device comprises nonvolatile memory and logic configured to (i) write a first value to a first location in the nonvolatile memory, (ii) detect a power loss event corresponding to the memory device, and (iii) before powering down the memory device based at least in part on the detected power loss event, write a second value to a second location in the nonvolatile memory different from the first location. The first value and/or the second value can correspond to a current power cycle number of the memory device. After power is subsequently restored to the memory device, the logic can compare the first and second values and proceed with reconstructing the memory device using APL management data when the first value matches the second value.

19 Claims, 4 Drawing Sheets

230

231 — Write first value to first location in nonvolatile memory

232 — Detect power loss event

233 — Invoke and execute APL task

234 — Write second value to second location in nonvolatile memory

235 — Compute checksum and store to third location in nonvolatile memory

236 — Power down

MEMORY WITH IMPROVED INCOMPLETE ACTIVE PERFORMANCE LOSS TASK COMPLETION DETECTION

CROSS-REFERENCE TO RELATED APPLICATION(S)

The present application claims priority to U.S. Provisional Patent Application No. 63/453,432, filed Mar. 20, 2023, the disclosure of which is incorporated herein by reference in its entirety.

TECHNICAL FIELD

The present disclosure is related to memory systems, devices, and associated methods. For example, several embodiments of the present technology are directed to memory systems with improved active performance loss (APL) task completion detection.

BACKGROUND

Memory devices are widely used to store information related to various electronic devices such as computers, wireless communication devices, cameras, digital displays, and the like. Memory devices are frequently provided as internal, integrated circuits and/or as part of external removable devices in computers or other electronic devices. There are many different types of memory, including volatile and non-volatile memory. Volatile memory, including static random-access memory (SRAM), dynamic random-access memory (DRAM), and synchronous dynamic random-access memory (SDRAM), among others, may require a source of applied power to maintain its data. Non-volatile memory, by contrast, can retain its stored data even when not externally powered. Non-volatile memory is available in a wide variety of technologies, including flash memory (e.g., NAND and NOR), phase change memory (PCM), ferroelectric random-access memory (FeRAM), resistive random-access memory (RRAM), and magnetic random-access memory (MRAM), among others. Improving memory devices, generally, may include increasing memory cell density, increasing performance (e.g., read, write, erase speeds) or otherwise reducing operational latency, increasing reliability, increasing data retention, reducing power consumption, reducing manufacturing costs, or reducing dimensional attributes, among other metrics.

BRIEF DESCRIPTION OF THE DRAWINGS

The disclosure will be understood more fully from the detailed description given below and from the accompanying drawings of various embodiments of the disclosure. The components in the drawings are not necessarily to scale. Instead, emphasis is placed on illustrating clearly the principles of the present technology. The drawings should not be taken to limit the disclosure to the specific embodiments, but are provided for explanation and understanding.

DETAILED DESCRIPTION

Figure 1:
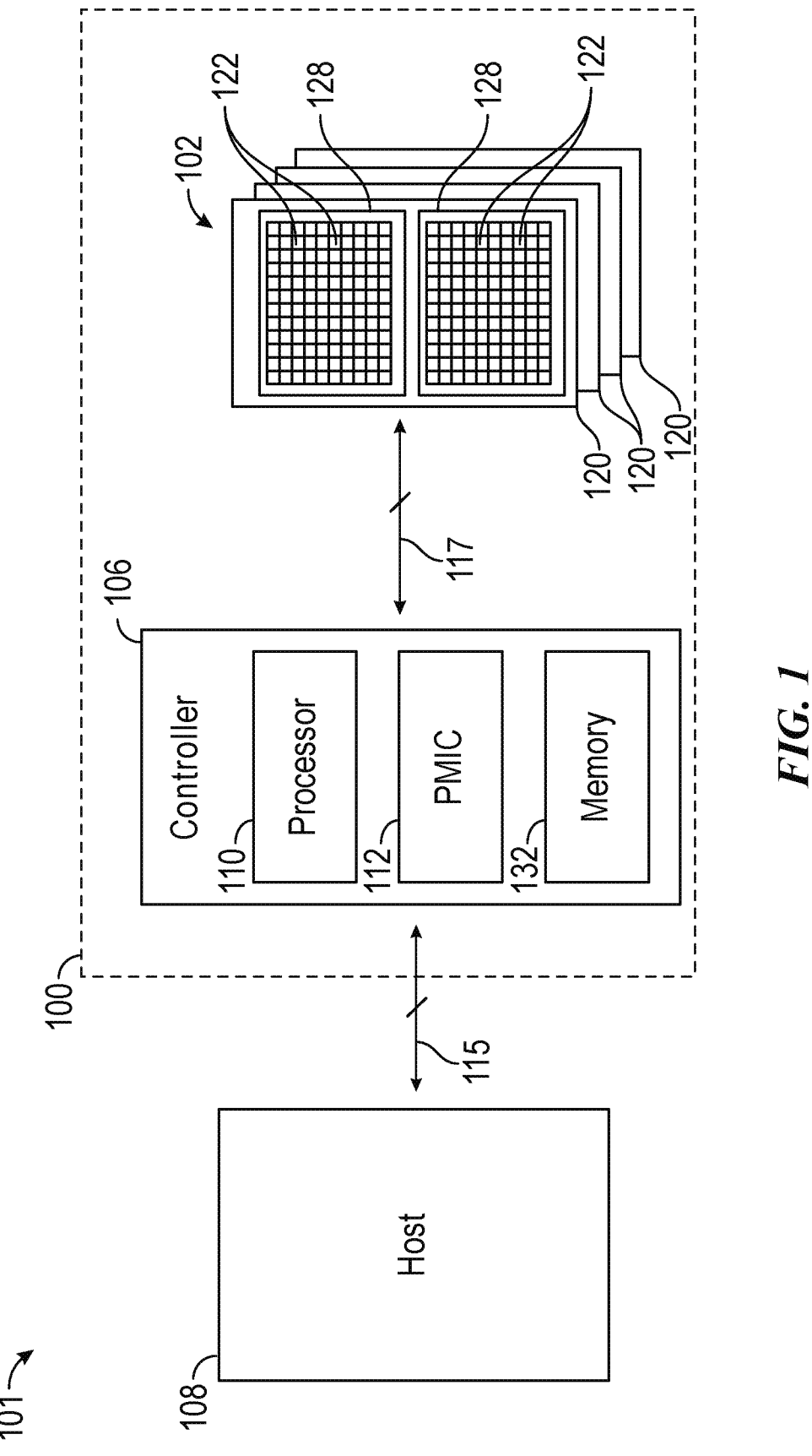
FIG. 1 is a partially schematic block diagram of a memory system configured in accordance with various embodiments of the present technology.

As discussed in greater detail below, the technology disclosed herein relates to memory systems and devices (and associated methods) with improved APL task completion detection. A person skilled in the art, however, will understand that the technology may have additional embodiments and that the technology may be practiced without several of the details of the embodiments described below with reference to FIGS. 1-3.

In the illustrated embodiments below, the memory systems and devices are primarily described in the context of memory devices incorporating NAND-based storage media (e.g., NAND flash, 3D-NAND flash). Memory systems and devices configured in accordance with other embodiments of the present technology, however, can include other types of memory devices (e.g., phase change memory, ferroelectric, etc.) and/or can include main memories that are not NAND-based (e.g., NOR-based) or only partially NAND-based. Moreover, memory systems and devices configured in accordance with still other embodiments of the present technology can include volatile memories, such as DRAM and/or SRAM memories.

A. Overview

Many memory systems invoke an active performance loss (APL) task upon a sudden power loss event. The APL task typically involves (1) flushing in-flight data to non-volatile memory such that no data currently being transferred to a memory system is lost due to the power loss event and (2) performing various other functions such that the memory system can be booted in a known and functional state when power is restored. One of these other functions includes, at the end of the APL task, (i) generating a checksum based on APL management data written to designated APL pages (also known as root information pages) of the memory system during execution of the APL task, and (ii) storing the checksum in the APL pages for the memory system to reference the next time the memory system is booted up. After writing the checksum, the memory system then proceeds to power down.

At a next powerup of the memory system, the memory system locates and retrieves the checksum from the APL pages, recomputes the checksum using the corresponding APL management data, and compares the retrieved checksum to the recomputed checksum. When the checksums match, the memory system proceeds to use the corresponding APL management data to reconstruct and restore the memory system to a normal operating state. On the other hand, when the checksums do not match, the memory system (i) assumes that at least a portion of the corresponding APL management data has been lost or corrupted, (ii) proceeds to enter a safe mode of operation (e.g., in which host reads are enabled but host writes are disabled), and (iii) notifies the host device of the mismatch.

Because a memory system typically computes and writes a checksum to APL pages at or near the end of an APL task, the presence of a checksum in the APL pages when the memory device is next powered on can provide an indication that the memory system successfully completed an APL task before powering down. But the mere presence of a checksum in the APL pages is not dispositive of the fact that the most recently invoked APL task was successfully completed. For example, in the event that the memory system was unable to successfully complete a most recent iteration of the APL task before shutting down, the memory system likely will not have generated and/or written a checksum to the APL pages for that iteration of the APL task. Nevertheless, the APL pages may still include a checksum that corresponds to a previous (e.g., a second-to-last) iteration of the APL task that was successfully completed. Thus, continuing with this example, when the memory system attempts to locate and retrieve a checksum from the APL pages at a next powerup of the memory system, the memory system is likely to locate the checksum corresponding to the previous (e.g., the second-to-last) iteration of the APL task. When this occurs, the memory system will proceed to (i) retrieve the checksum for the previous iteration of the APL task, (ii) recompute a checksum based on APL management data that corresponds to the previous iteration of the APL task, and (iii) compare the retrieved checksum to the recomputed checksum. Given the high probability that the checksums will match, the memory system will likely proceed to use the APL management data corresponding to the previous iteration of the APL task to reconstruct and restore the memory system to a normal operating state. But because the APL management data used to reconstruct and restore the memory device corresponds to the previous iteration of the APL task rather than the most recent or current iteration of the APL task, reconstruction and restoration of the memory system to a normal operating state using the APL management data of the previous APL task may lead to malfunctioning of the memory system and/or other unintended consequences.

To address these concerns, the present technology is generally directed to memory systems and devices that are configured to (i) write a first value to a first location in nonvolatile memory, (ii) detect a power loss event corresponding to the memory system, and (iii) before powering down the memory device based at least in part on the detected power loss event, write a second value to a second location in the nonvolatile memory different from the first location. In some embodiments, the first value and the second value can correspond to a current power cycle number of the memory device. In these and other embodiments, the first location can correspond to a file system area of the memory device, and/or the second location can correspond to APL pages that are allocated in the memory array of the memory device (e.g., in response to detecting the power loss event). Additionally, or alternatively, the memory device can write the first value to the first location and the second value to the second location in addition to or in lieu of computing and storing a checksum corresponding to a current iteration of the APL task.

After power is subsequently restored to the memory device, the memory device can (a) retrieve the first value from the first location and the second value from the second location and (b) compare the first and second values to ensure that they match. When the memory device determines that the first value matches the second value, the memory device can assume that (i) the most recent iteration of the APL task successfully completed before the memory device was powered down in response to the power loss event and (ii) APL management data (e.g., inclusive of the second value) identified or located by the memory device corresponds to the most recent iteration of the APL task. Thus, the memory device can proceed with reconstructing or restoring the memory device using APL management data that was generated and/or stored to the memory device while executing the most recent iteration of the APL task. On the other hand, when the memory device determines that the first value does not match the second value, the memory device can assume that (i) the most recent iteration of the APL task did not successfully complete before the memory device was shut down in response to the power loss event and/or (ii) APL management data identified or located by the memory device corresponds to a previous (e.g., a second-to-last) iteration of the APL task as opposed to a most recent iteration of the APL task. In turn, the memory device can, without proceeding to reconstruct or restore the memory device using the APL management data, enter a safe mode of operation and/or notify a connected host device of the error.

Comparison of the first value to the second value in this manner ensures that only APL management data corresponding to a most recent iteration of the APL task is used to reconstruct or restore a memory device after power has been restored to the memory device following a power loss event, and/or only when the most recent iteration of the APL task was successfully completed before the memory device powered down due to the power loss event. In this manner, the present technology avoids the malfunctioning and/or other unintended consequences that can occur when (a) the most recent iteration of the APL task does not successfully complete before the memory device is shut down in response to a power loss event, (b) a checksum for the most recent iteration of the APL task is therefore not stored to the memory device before the shutdown, (c) the memory device locates a checksum corresponding to a previous iteration of the APL task as a result, and (d) the memory device is reconstructed or restored using APL management data corresponding to the previous iteration of the APL task as opposed to APL management data corresponding the most recent iteration of the APL task. In other words, the present technology facilitates (a) improved detection of incomplete APL tasks in comparison to other memory devices and (b) better adherence to various specifications or standards for corresponding memory systems and/or devices (e.g., better adherence to Section 6.2.2 of the Open Compute Project Datacenter NVMe® SSD Specification, Version 2.0).

B. Selected Embodiments of Memory Systems and Devices with Flexible Erase Suspend-Resume Operations, and Associated Methods FIG. 1 is a block diagram of a memory system 101 configured in accordance with various embodiments of the present technology. As shown, the memory system 101 includes a memory device 100 and a host device 108. An example of a memory device 100 is a storage system, such as a solid-state drive (SSD). In some embodiments, the memory device 100 is a hybrid memory/storage sub-system.

As shown, the memory device 100 includes a memory array 102 and a controller 106 (e.g., a processing device, an internal processing circuit) operably coupling the memory array 102 to the host device 108 (e.g., an upstream central processor (CPU)). The memory array 102 can include a plurality of memory regions, or memory units 120, which include a plurality of memory cells 122. Memory units 120 can be individual memory dies, memory planes in a single memory die, a stack of memory dies vertically connected with through-silicon vias (TSVs), or the like. In one embodiment, each of the memory units 120 can be formed from a semiconductor die and arranged with other memory unit dies in a single device package (not shown). In other embodiments, one or more of the memory units 120 can be co-located on a single die and/or distributed across multiple device packages.

The memory cells 122 can include, for example, NAND flash and/or other suitable storage elements (e.g., NOR flash, read only memory (ROM), electrically erasable program-mable ROM EEPROM, erasable programmable ROM (EPROM), ferroelectric, magnetoresistive, phase change memory, etc.) configured to store data persistently or semi-persistently. In one example, the memory cells 122 are arranged in memory pages that are arranged in memory blocks 128. Continuing with this example, the memory blocks 128 can be arranged in memory planes, and the memory planes can be arranged in memory dies. As a specific example, the memory cells 122 can include NAND-flash storage elements arranged in a three-dimensional (3D) NAND configuration or architecture.

The memory array 102 and/or the individual memory units 120 can also include other circuit components (not shown) (e.g., memory subsystems), such as internal pro-cessing circuits, multiplexers, decoders, buffers, read/write drivers, address registers, data out/data in registers, etc., for accessing and/or programming (e.g., writing or erasing) the memory cells 122 and other functionality, such as for processing information and/or communicating with the con-troller 106 via a device bus 117.

The controller 106 can be a microcontroller, special purpose logic circuitry (e.g., a field programmable gate array (FPGA), an application specific integrated circuit (ASIC), etc.), or other suitable processor. The controller 106 can include a processor 110 configured to execute instructions stored in memory 132. The processor 110 can be a process-ing device. The controller 106 can additionally include a power management integrated circuit 112 ("PMIC 112"). Although shown as being included within the controller 106 and separate from the processor 110 in the illustrated embodiment, the PMIC 112 can be a component of the processor 110 or can be circuitry positioned external to the controller 106 in other embodiments.

The memory 132 can be configured to store various processes, logic flows, routines, and/or firmware for con-trolling operation of the memory device 100, including managing the memory array 102 and handling communica-tions between the memory device 100 and the host device 108. For example, the memory 132 can store firmware for performing APL tasks (described in greater detail below with reference to FIGS. 2A and 2B), such as when the PMIC 112 detects a sudden power loss event. In some embodi-ments, the memory 132 can include timers and/or memory registers (e.g., for storing memory pointers, fetched data, timer values, etc.). The memory 132 can also include read-only memory (ROM) for storing micro-code. In the illustrated embodiment, the memory 132 is embedded into the controller 106. In other embodiments, all or a subset of the memory 132 can be positioned at other locations within the memory device 100. For example, the memory 132 can include a restricted region of the memory array 102 and/or can be positioned separate or apart from the memory array 102 and the controller 106.

Although not shown in FIG. 1, the memory device 100 can include a file system area (FSA) in which various information, processes, logic flows, routines, and/or firm-ware for operating the memory device 100 can be stored. All or a subset of the FSA can be included within the memory 132 of the controller 106 in some embodiments. In these and other embodiments, all or a subset of the FSA can be included in the memory array 102. For example, a subset of the memory cells 122 of the memory array 102 can be dedicated and/or restricted to serving as at least a portion of the FSA. In these and still other embodiments, the FSA can be positioned within the memory device 100 and external to the controller 106 and/or the memory array 102.

The controller 106 communicates with the host device 108 over a system bus 115. In some embodiments, the host device 108 and the controller 106 can communicate over a serial interface, such as a serial attached SCSI (SAS), a serial AT attachment (SATA) interface, a peripheral component interconnect express (PCIe), or other suitable interface (e.g., a parallel interface). The host device 108 can send various requests (e.g., in the form of a packet or stream of packets) to the controller 106. A request can include a command to write, erase, return information, and/or perform a particular operation (e.g., a TRIM operation). In some embodiments, the host device 108 can send various vendor specific (VS) commands to perform one or more restricted operations (e.g., access a restricted region of the memory array 102, enter a debugging mode, reset restricted data, etc.). In operation, the controller 106 can directly read, write, erase, or otherwise program or manage the various memory regions of the memory array 102, such as by reading from and/or writing to groups of memory cells 122 (e.g., memory pages, stripes of memory pages, memory blocks 128, etc.).

As discussed in greater detail below with reference to FIGS. 2A and 2B, the memory device 100 can be configured, upon powerup of the memory device 100) to write a first value (e.g., a current boot cycle value) to a first location in nonvolatile memory of the memory device 100. For example, the memory device 100 can be configured to write the first value to a region of the FSA. In these and other embodiments, the memory device 100 can be configured, upon detection of a sudden power loss event at the host device 108 and/or at the memory device 100, to invoke an active performance loss (APL) task and/or allocate APL pages (e.g., regions in the memory array 102) for storage of APL management data. As part of executing the APL task, the memory device 100 can be configured to flush data currently being transmitted (a) from the host device 108 and/or the controller 106 to (b) the controller 106 and/or the memory array 102, respectively, such that the data is not lost due to the power loss event. Additionally, or alternatively, the memory device 100 can be configured to perform various other functions while executing the APL task such that the memory system 101 and/or the memory device 100 can be booted in a known and functional state when power is restored. For example, the memory device 100 can be configured to generate and/or write APL management data to APL pages, and/or generate and/or write a checksum to the APL pages. In some embodiments, the APL management data written to the APL pages can include a second value (e.g., the current boot cycle value). When the memory device 100 is subsequently powered on, the memory device 100 can retrieve the first value stored to the first location in the nonvolatile memory (e.g., in the FSA) and the second value stored in the APL pages; compare the first and second values; and proceed to reconstruct and restore the memory device 100 using the APL management data in the APL pages when the first and second values match. In embodi-ments in which the memory device 100 computes and stores a checksum to nonvolatile memory as part of the APL task in addition to storing the second value, the memory device 100 can also check the checksum upon powerup to ensure none of the APL management data has been lost or cor-rupted.

Figure 2A:
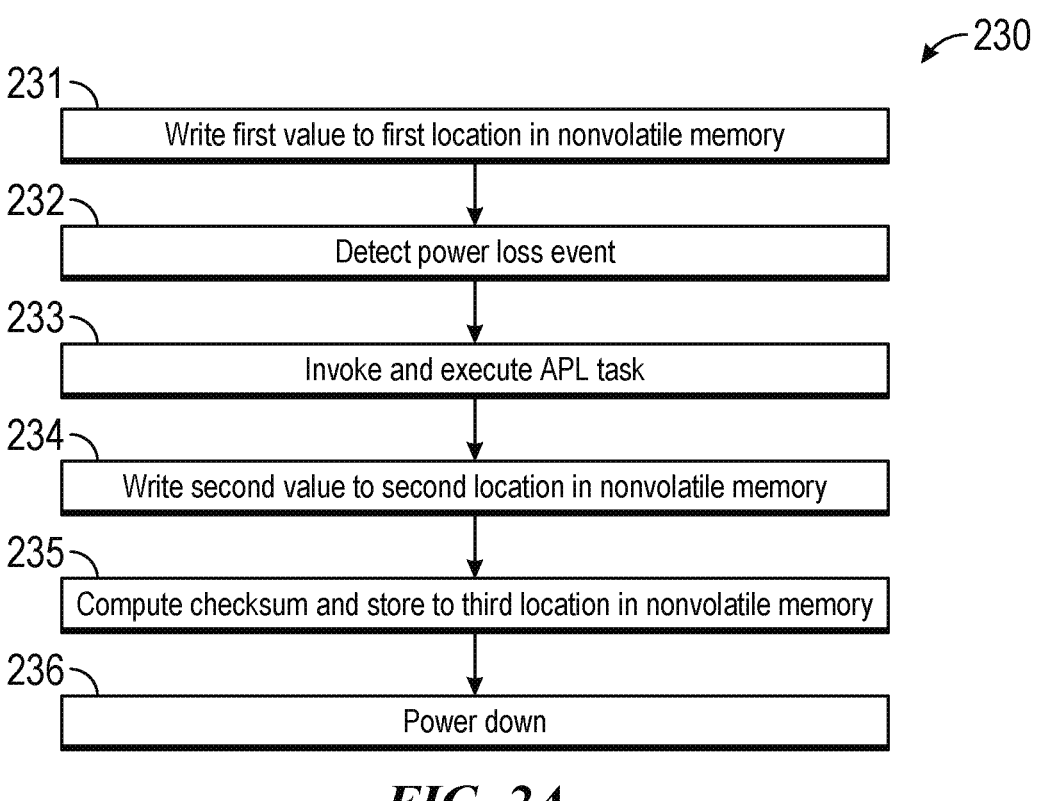
FIGS. 2A and 2B are flow diagrams illustrating methods of operating a memory system in accordance with various embodiments of the present technology.

FIG. 2A is a flow diagram illustrating a method 230 of operating a memory system in accordance with various embodiments of the present technology. For example, the method 230 can be a method performed at least in part in anticipation of and/or in response to detection of a sudden power loss event corresponding to the memory system and/or the memory device. The method 230 is illustrated as a set of steps or blocks 231-236. All or a subset of one or more of the blocks 231-236 can be executed by various components of a memory system (e.g., the memory system 101 of FIG. 1) and/or of a memory device (e.g., the memory device 100 of FIG. 1), such as (a) by a controller and/or a memory array of a memory device and/or (b) by a host device. In these and other embodiments, all or a subset of the one or more blocks 231-236 can be executed by logic (e.g., of the controller, or the memory array, of the host device) controlling nonvolatile memory of the memory device. Furthermore, all or a subset of one or more of the blocks 231-236 can be executed in accordance with the discussion above.

At block 231, the method 230 begins by writing a first value to a first location in nonvolatile memory of a memory device. In some embodiments, the first value can correspond to a current power cycle of the memory device. For example, the first value can be a current power cycle number of the memory device. In other embodiments, the first value can be another value, such as a value that is updated upon the occurrence of a specified event. For example, the first value can be a value that is updated each time the memory device is powered down, or a value that is updated each time the memory device detects a power loss event and/or invokes an APL task. In some embodiments, the first location in non-volatile memory of the memory device can correspond to a region in a memory array of the memory device, in a memory embedded in a controller of the memory device, and/or in a file system area (FSA) of the memory device. Additionally, or alternatively, the first location in nonvolatile memory can correspond to a region in another suitable nonvolatile memory of the memory device.

In some embodiments, writing the first value to the first location can include writing the first value to the first location upon powerup of the memory device, such as during a boot sequence, an initialization process, a reconstruction process, and/or a restoration process of the memory device. In other embodiments, writing the first value to the first location can include writing the first value to the first location when the memory device detects a specified event or performs a specified action, such as when the memory device detects a power loss event at a connected host device and/or at the memory device, when the memory device invokes an APL task, or when the memory device is powered down. In still other embodiments, writing the first value to the first location can include writing the first value to the first location as part of executing an APL task (e.g., as part of a first or initial set of functions performed while executing the APL task). In some embodiments, writing the first value to the first location can include updating the first value from a previous value to new value. Updating the previous value of the first value to the new value can include overwriting the previous value with the new value, or writing the new value such that the memory device can later (e.g., upon a next powerup of the memory device) identify the new value as a most recent version of the first value. Additionally, or alternatively, updating the previous value to the new value can include updating the previous value to the new value after (i) comparing the previous value of the first value to another written instance of the previous value stored to another location in nonvolatile memory of the memory device, and (ii) determining that the previous value of the first value matches the other written instance of the previous value stored to the other location. Such a comparison process is discussed in greater detail below with reference to blocks 245-248 of FIG. 2B.

At block 232 of FIG. 2A, the method 230 continues by detecting a power loss event. The power loss event can be detected at the memory device and/or at a host device operably coupled to the memory device. In some embodiments, the power loss event can include or correspond to a sudden power loss event. In these and other embodiments, the power loss event can correspond to a shutdown or restart sequence of the memory device. In these and still other embodiments, the power loss event can be detected using a PMIC of the memory device.

At block 233, the method 230 continues by invoking and executing an APL task. Invoking the APL task can include invoking the APL task in response to or based at least in part on detecting the power loss event at block 232. In these and other embodiments, executing the APL task can include flushing data currently being transmitted (a) from a connected host device and/or from a controller of the memory device to (b) the controller and/or to a memory array of the memory device, respectively, such that the data is not lost due to the power loss event and/or can be accessed when power is restored to the memory device. Additionally, or alternatively, executing the APL task can include performing various other functions such that the memory device and/or the corresponding memory system can be booted in a known and functional state when power is restored. For example, executing the APL task can include generating and/or writing APL management data to APL pages (e.g., root information pages) of the memory device. The APL management data can include data that can be used to reconstruct and/or restore the memory device when the memory device is next powered on.

At block 234, the method 230 continues by writing a second value to a second location in nonvolatile memory of the memory device. The second value can correspond to the first value. For example, the second value can be equivalent to and/or be a copy of the first value. In some embodiments, the second value can correspond to a current power cycle of the memory device. For example, the second value can be a current power cycle number of the memory device. In other embodiments, the second value can be another value, such as a value that is updated upon the occurrence of a specified event. For example, the second value can be a value that is updated each time the memory device is powered down, or a value that is updated each time the memory device detects a power loss event and/or invokes an APL task. In some embodiments, the second location in nonvolatile memory of the memory device can correspond to APL pages of the memory device or to another suitable region in the memory array of the memory device, in the memory embedded into the controller, in the FSA, and/or in other nonvolatile memory of the memory device. The second location can be different from the first location. As a specific example, the first location can correspond to the FSA of the memory device and the second location can correspond to APL pages of the memory device.

In some embodiments, writing the second value to the second location can include (i) reading the first value from the first location at which the first value was written at block 231 and (ii) writing the first value to the second location. In these and other embodiments, writing the second value can include retrieving, computing, and/or writing the second value to the second location independently of the first value stored to the first location. In these and still other embodiments, writing the second value to the second location can include writing the second value to the second location at or near an end of the APL task (e.g., after successfully executing all or a subset of the other functions corresponding to the current iteration of the APL task). In some embodiments, writing the second value to the second location can include writing the second value to the second location such that the memory device can later (e.g., upon a next powerup of the memory device) identify the second value as a most recent version of the second value.

At block 235, the method 230 continues by generating and storing, to a third location in nonvolatile memory, a checksum corresponding to the current iteration of the APL task. Generating the checksum can include generating the checksum based on APL management data corresponding to the current iteration of the APL task. The APL management data can include the second value and/or other data written to the APL pages of the memory device and/or to one or more other locations of nonvolatile memory. Storing the checksum to the third location can include writing the checksum to the APL pages of the memory device or to another region in the memory array, in the memory embedded into the controller, in the FSA, and/or in other nonvolatile memory of the memory device. The third location can be different from the first location and/or the second location. In these and other embodiments, storing the checksum can include storing the checksum such that the memory device can later (e.g., upon a next powerup of the memory device) identify the checksum as a checksum that corresponds to the most recent iteration of the APL task.

At block 236, the method 230 continues by powering down the memory device. In some embodiments, powering down can include shutting down or restarting the memory device. Shutting down the memory device can include shutting down the memory device at least until power to the memory device and/or to the corresponding memory system is restored. In these and other embodiments, powering down the memory device includes powering down the memory device after successfully completing the APL task.

Although the steps of the method 230 are discussed and illustrated in a particular order, the method 230 of FIG. 2A is not so limited. In other embodiments, the steps of the method 230 can be performed in a different order. In these and other embodiments, any of the steps of the method 230 can be performed before, during, and/or after any of the other steps of the method 230. For example, blocks 231, 234, and/or 235 can be performed while executing block 233. More specifically, the method 230 can write the first value to the first location in nonvolatile memory (block 231), write the second value to the second location in nonvolatile memory (block 234), and/or compute and store the checksum to the third location in nonvolatile memory (block 235) as part of executing the APL task (block 233). Furthermore, a person skilled in the art will readily recognize that the method 230 can be altered and still remain within these and other embodiments of the present technology. For example, one or more steps of the method 230 can be omitted and/or repeated in some embodiments. As a specific example, block 235 and/or block 236 can be omitted in some embodiments. As another example, block 231 can be omitted in some embodiments, such as in embodiments in which the first value is updated at block 248 of method 240 of FIG. 2B (discussed in greater detail below) before the method 240 proceeds to block 232 of the memory 230 of FIG. 2A.

Figure 2B:
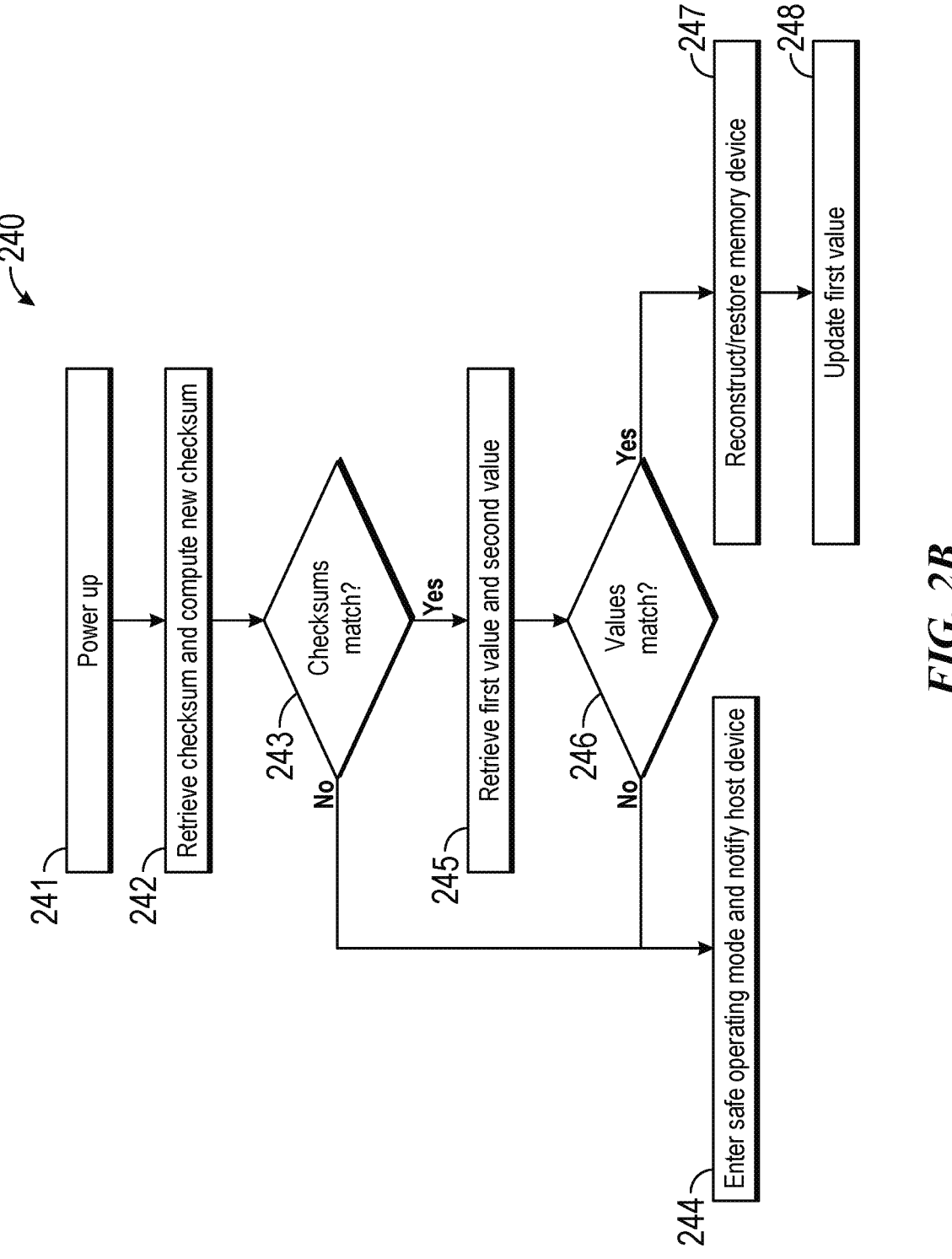

FIG. 2B is a flow diagram illustrating another method 240 of operating a memory system in accordance with various embodiments of the present technology. For example, the method 240 can be a method performed upon powerup of a memory device following a shutdown of the memory device due to a sudden power loss event corresponding to a memory system and/or the memory device. The method 240 is illustrated as a set of steps or blocks 241-248. All or a subset of one or more of the blocks 241-248 can be executed by various components of a memory system (e.g., the memory system 101 of FIG. 1) and/or of a memory device (e.g., the memory device 100 of FIG. 1), such as (a) by a controller and/or a memory array of a memory device and/or (b) by a host device. Furthermore, all or a subset of one or more of the blocks 241-248 can be executed in accordance with the discussion above. For the sake of clarity and example, the method 240 is discussed in detail below with repeated reference to the method 230 of FIG. 2A, and the discussion of the method 240 below assumes that the method 230 was executed (at least in part) for a memory device prior to powerup of the memory device at block 241 of the method 240.

At block 241, the method 240 begins by powering on a memory device and/or a corresponding memory system. In some embodiments, powering on the memory device and/or the corresponding memory system can include powering on the memory device/system after the memory device/system was powered down following a power loss event (e.g., a sudden power loss event). For example, powering on the memory device and/or the corresponding memory system can include powering on the memory device/system when power is restored to the memory device/system. As a specific example, powering on the memory device and/or the corresponding memory system can include powering on the memory device/system when power is restored after shutting down the memory device/system at block 236 of the method 230 of FIG. 2A in response to detection of a sudden power loss event.

At block 242, the method 240 continues by (a) retrieving the checksum stored to the third location in nonvolatile memory of the memory device, and (b) computing a new checksum for comparison with the retrieved checksum. The third location can correspond to the third location discussed above with reference to block 235 of the method 230 of FIG. 2A. Computing the new checksum can include computing a new checksum based on the same set of data (e.g., APL management data) and/or on data stored to a same memory region that was used to compute the retrieved checksum computed at block 235 of the method 230 of FIG. 2A. For example, computing the new checksum can include computing a new checksum in a same or similar manner as the retrieved checksum was computed at block 235 of the method 230. As discussed above with reference to block 235 of the method 230 of FIG. 2A, the APL management data corresponding to the retrieved checksum can include (i) the second value written to the second location in nonvolatile memory at block 234 of the method 230 of FIG. 2A and/or (ii) other data written to the APL pages of the memory device and/or to one or more other locations in nonvolatile memory. In some embodiments, the other data included in the APL management data can be data usable to boot the memory device/system to a known and functional state.

At block 243, the method 240 continues by (a) comparing the retrieved checksum with the newly computed checksum, and (b) determining whether the checksums match. In the event that the checksums do not match (block 243: No), the method 240 can assume that at least some of the data upon which the retrieved checksum was computed has been lost or corrupted, and/or can proceed to block 244 to enter a safe mode of operation and notify the host device of the error. In some embodiments, the memory device can enter the safe mode of operation by enabling host data reads and/or disabling host data writes. In these and other embodiments, the memory device can, after notifying the host device of the mismatch, remain in the safe mode of until the error is resolved (e.g., via debugging performed on the memory device by an engineer or technician). On the other hand, referring again to block 243, in the event that the checksums match (block 243: Yes), the method 240 can proceed to block 245.

At block 245, the method 240 continues by retrieving the (a) the first value stored to the first location in nonvolatile memory of the memory device, and (b) the second value stored to the second location in nonvolatile memory of the memory device. The first location can correspond to the first location discussed above with reference to block 231 of the method 230 of FIG. 2A, and the second location can correspond to the second location discussed above with reference to block 234 of the method 230 of FIG. 2A. For example, the first location can correspond to the FSA of the memory device, and the second location can correspond to APL pages of the memory device. Continuing with this example, retrieving the first value can include reading the first value from the FSA, and/or retrieving the second value can include reading the second value from the APL pages to which the memory device has stored APL management data corresponding to the checksum retrieved at block 242. As discussed above with reference to blocks 231 and 234 of the method 230 of FIG. 2A, the first value and/or the second value can be or correspond to a power cycle number of the memory device, or to another value (e.g., a value that is updated upon the occurrence of a specified event).

At block 246, the method 240 continues by (a) comparing the first value with the second value, and (b) determining whether the first value matches the second value. In the event that the first value does not match the second value (block 246: No), the method 240 can assume that the checksum retrieved at block 242 does not correspond to the most recently invoked APL task (e.g., indicating that the most recently invoked APL task may not have successfully completed prior to the memory device shutting down, for example, in response to a sudden power loss event), and/or can proceed to block 244 to enter the safe mode of operation and notify the host device of the error. On the other hand, in the event that the first value matches the second value (block 246: Yes), the method 240 can assume that the checksum retrieved at block 242 corresponds to the most recently invoked APL task (e.g., indicating that the most recently invoked APL task was successfully completed prior to the memory device shutting down at block 236 of the method 230 of FIG. 2A), and/or can proceed to block 247. In some embodiments, the method 240 can proceed to block 247 only when the first value matches the second value (block 246: Yes), or only when the retrieved checksum matches the newly computed checksum (block 243: Yes) and the first value matches the second value (block 246: Yes).

At block 247, the method 240 continues by reconstructing/restoring the memory device using the APL management data. As discuss above, the APL management data can correspond to data written to APL pages of the memory device while executing the APL task at blocks 233, 234, and/or 235 of the method 230 of FIG. 2A. Additionally, or alternatively, the APL management data can correspond to the checksum retrieved at block 242 and verified at block 243 of the method 240 of FIG. 2B.

At block 248, the method 240 continues by updating the first value. Updating the first value can include updating the first value in a manner generally similar to the manner in which the first value is written to the first location at block 231 of the method 230 of FIG. 2A. For example, updating the first value can include writing the first value to a location in nonvolatile memory. Additionally, or alternatively, updating the first value can include updating the first value from a previous value to new value. Updating the previous value of the first value to the new value can include overwriting the previous value with the new value, or writing the new value such that the memory device can later (e.g., upon a next powerup of the memory device) identify the new value as a most recent version of the first value. Additionally, or alternatively, updating the previous value to the new value can include updating the previous value to the new value after or while reconstructing/restoring the memory device at block 247. For example, updating the first value can include updating the first value at an end of the reconstruction/restoration process or after the memory device has successfully reconstructed/restored the memory device. In some embodiments, after updating the first value, the method 240 can proceed to block 232 of the method 230 of FIG. 2A.

Although the steps of the method 240 are discussed and illustrated in a particular order, the method 240 of FIG. 2B is not so limited. In other embodiments, the steps of the method 240 can be performed in a different order. In these and other embodiments, any of the steps of the method 240 can be performed before, during, and/or after any of the other steps of the method 240. For example, blocks 242 and 243 can be performed while or after executing blocks 245 and 246. As another example, block 248 can be executed before or while executing block 247. Furthermore, a person skilled in the art will readily recognize that the method 240 can be altered and still remain within these and other embodiments of the present technology. For example, one or more steps of the method 240 can be omitted and/or repeated in some embodiments. As a specific example, block 248 of the method 240 can be omitted (e.g., in embodiments in which the method 240 proceeds from block 247 to block 231 of the method 230 of FIG. 2A). As another specific example, blocks 242 and 243 of the method 240 can be omitted in some embodiments.

Figure 3:
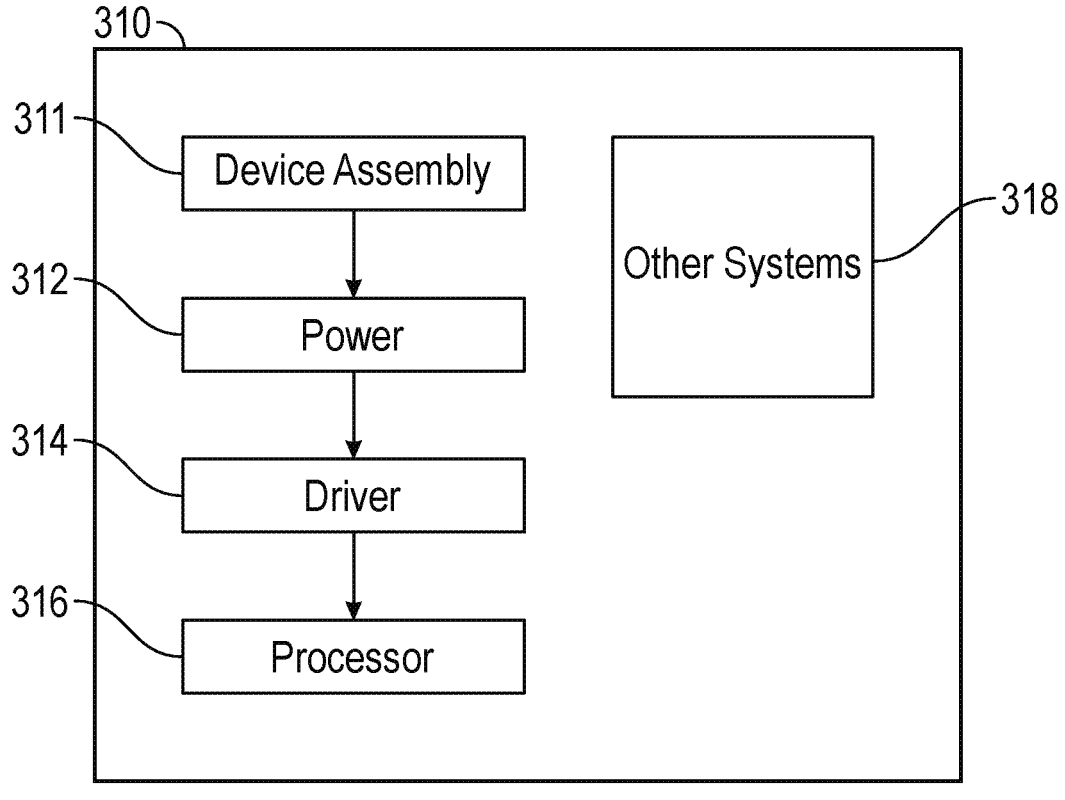
FIG. 3 is a schematic view of a system that includes a semiconductor device assembly configured in accordance with various embodiments of the present technology.

FIG. 3 is a schematic view of a system that includes a memory device in accordance with embodiments of the present technology. Any one of the foregoing memory devices described above can be incorporated into any of a myriad of larger and/or more complex systems, a representative example of which is system 310 shown schematically in FIG. 3. The system 310 can include a semiconductor device assembly 311, a power source 312, a driver 314, a processor 316, and/or other subsystems and components 318. The semiconductor device assembly 311 can include features generally similar to those of the memory devices described above with reference to FIGS. 1-2B. The resulting system 310 can perform any of a wide variety of functions, such as memory storage, data processing, and/or other suitable functions. Accordingly, representative systems 310 can include, without limitation, hand-held devices (e.g., mobile phones, tablets, digital readers, and digital audio players), computers, vehicles, appliances, and other products. Components of the system 310 may be housed in a single unit or distributed over multiple, interconnected units (e.g., through a communications network). The components of the system 310 can also include remote devices and any of a wide variety of computer readable media.

C. Conclusion

As used herein, the terms "memory system" and "memory device" refer to systems and devices configured to temporarily and/or permanently store information related to various electronic devices. Accordingly, the term "memory device" can refer to a single memory die and/or to a memory package containing one or more memory dies. Similarly, the term "memory system" can refer to a system including one or more memory dies (e.g., a memory package) and/or to a system (e.g., an SSD) including one or more memory packages.

Where the context permits, singular or plural terms can also include the plural or singular term, respectively. In addition, unless the word "or" is expressly limited to mean only a single item exclusive from the other items in reference to a list of two or more items, then the use of "or" in such a list is to be interpreted as including (a) any single item in the list, (b) all of the items in the list, or (c) any combination of the items in the list. Furthermore, as used herein, the phrase "and/or" as in "A and/or B" refers to A alone, B alone, and both A and B. Additionally, the terms "comprising," "including," "having" and "with" are used throughout to mean including at least the recited feature(s) such that any greater number of the same feature and/or additional types of other features are not precluded. Moreover, as used herein, the phrases "based on," "depends on," "as a result of," and "in response to" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on" or the phrase "based at least partially on."

The above detailed descriptions of embodiments of the technology are not intended to be exhaustive or to limit the technology to the precise form disclosed above. Although specific embodiments of, and examples for, the technology are described above for illustrative purposes, various equivalent modifications are possible within the scope of the technology, as those skilled in the relevant art will recognize. For example, while steps are presented and/or discussed in a given order, alternative embodiments can perform steps in a different order. Furthermore, the various embodiments described herein can also be combined to provide further embodiments.

From the foregoing, it will be appreciated that specific embodiments of the technology have been described herein for purposes of illustration, but well-known structures and functions have not been shown or described in detail to avoid unnecessarily obscuring the description of the embodiments of the technology. From the foregoing, it will also be appreciated that various modifications can be made without deviating from the technology. For example, various components of the technology can be further divided into subcomponents, or various components and functions of the technology can be combined and/or integrated. Furthermore, although advantages associated with certain embodiments of the technology have been described in the context of those embodiments, other embodiments can also exhibit such advantages, and not all embodiments need necessarily exhibit such advantages to fall within the scope of the technology. Accordingly, the disclosure and associated technology can encompass other embodiments not expressly shown or described herein.

What is claimed is:

1. A method of operating a memory device, the method comprising:

writing a first value to a first location in nonvolatile memory of the memory device;

detecting a power loss event corresponding to the memory device;

in response to detecting the power loss event and before powering down the memory device due to the power loss event, writing a second value to a second location in the nonvolatile memory of the memory device, wherein the second location is different from the first location, and wherein the second value corresponds to the first value;

retrieving, after subsequent restoration of power to the memory device, the first value from the first location and the second value from the second location; and comparing the first value to the second value before reconstructing the memory device based at least in part on active performance loss (APL) management data stored to the nonvolatile memory of the memory device before the powering down of the memory device.

2. The method of claim 1, further comprising:

determining that the first value matches the second value; and based at least in part on the determination that the first value matches the second value, reconstructing the memory device based at least in part on the APL management data.

3. The method of claim 2, further comprising updating the first value after determining that the first and second values match.

4. The method of claim 1, further comprising:

determining that the first value does not match the second value; and based at least in part on the determination that the first value does not match the second value, entering the memory device into a safe mode of operation and notifying a connected host device of an error corresponding to a mismatch between the first value and the second value.

5. The method of claim 1, further comprising:

computing, before the powering down of the memory device, a checksum based at least in part on the APL management data; and storing, before the powering down of the memory device, the checksum to a third location in the nonvolatile memory of the memory device, wherein the third location is different from the first location and the checksum is different from the second value.

6. The method of claim 5, further comprising:

retrieving, after the subsequent restoration of power to the memory device, the checksum from the third location;

computing a new checksum based at least in part on at least a subset of the APL management data stored to the nonvolatile memory of the memory device before the powering down of the memory device; and comparing the checksum to the new checksum.

7. The method of claim 6, further comprising:

determining that (i) the checksum matches the new checksum and (ii) the first value matches the second value; and based at least in part on the determination that (i) the checksum matches the new checksum and (ii) the first value matches the second value, reconstructing the memory device based at least in part on the APL management data.

8. The method of claim 6, further comprising:

determining that (i) the checksum does not match the new checksum or (ii) the first value does not match the second value; and based at least in part on the determination that (i) the checksum does not match the new checksum or (ii) the first value does not match the second value, entering the memory device into a safe mode of operation and notifying a connected host device of an error corresponding to a mismatch between the checksum and the new checksum or between the first value and the second value.

9. The method of claim 1, wherein the first value corresponds to a power cycle number of the memory device.

10. The method of claim 1, wherein the second value corresponds to a power cycle number of the memory device.

11. The method of claim 1, wherein the first location corresponds to a file system area (FSA) of the memory device.

12. The method of claim 1, wherein the second location corresponds to active performance loss (APL) pages of the memory device.

13. A memory device, comprising:

a nonvolatile memory; and logic controlling the nonvolatile memory, wherein the logic of the memory device is configured to:

write a first value to a first location in the nonvolatile memory, wherein the first value corresponds to a current power cycle number of the memory device;

detect a power loss event corresponding to the memory device;

in response to detecting the power loss event and before powering down the memory device due to the detected power loss event, write a second value to a second location in the nonvolatile memory, wherein the second value corresponds to the current power cycle number of the memory device, and wherein the second location is different from the first location;

after subsequent restoration of power to the memory device, retrieve the first value from the first location and the second value from the second location; and compare the first value to the second value before reconstructing the memory device based at least in part on active performance loss (APL) management data stored to the nonvolatile memory of the memory device before the powering down of the memory device.

14. The memory device of claim 13, wherein the first location corresponds to a file system area (FSA) of the memory device.

15. The memory device of claim 13, wherein the logic is configured to write the first value to the first location prior to detecting the power loss event.

16. The memory device of claim 13, wherein the second location corresponds to a memory array of the memory device that includes a plurality of nonvolatile memory cells arranged in a plurality of memory regions, active performance loss (APL) pages of the memory device, or a combination thereof.

17. The memory device of claim 13, wherein the logic is further configured, after subsequent restoration of power to the memory device, to:

based at least in part on a determination that the first value matches the second value, reconstruct or restore the memory device based at least in part on active performance loss (APL) management data generated in response to detecting the power loss event.

18. The memory device of claim 13, wherein the logic is further configured, after subsequent restoration of power to the memory device, to:

(a) based at least in part on a determination that the first value does not match the second value and (b) without reconstructing or restoring the memory device based at least in part on active performance loss (APL) management data stored to the memory device before the powering down of the memory device, enter a safe mode of operation and notify a connected host device of an error corresponding to a mismatch between the first value and the second value.

19. A memory system, comprising:

a host device;

a memory device operably coupled to the host device, wherein the memory device includes nonvolatile memory; and logic controlling the nonvolatile memory, wherein the logic is configured to:

write a first value to a first location in the nonvolatile memory;

detect a power loss event corresponding to the memory system;

before powering down the memory device based at least in part on the detected power loss event— write a second value to a second location in the nonvolatile memory, wherein the second location is different from the first location, and store active performance loss (APL) management data to APL pages of the nonvolatile memory; and after power is subsequently restored to the memory system following the detection of the power loss event— retrieve the first value from the first location and the second value from the second location, compare the first value to the second value, and in response to determining that the first value matches the second value, reconstruct or restore the memory device based at least in part on the APL management data.

* * * * *